US010294441B2

(12) United States Patent
Sasaki et al.

(10) Patent No.: US 10,294,441 B2
(45) Date of Patent: May 21, 2019

(54) COATING COMPOSITION FOR LUBRICATING COATING FILM

(71) Applicant: DOW CORNING TORAY CO., LTD., Tokyo (JP)

(72) Inventors: Takahiko Sasaki, Odawara (JP); Tetsuji Yamaguchi, Kaisei (JP)

(73) Assignee: Dow Corning Toray Co., Ltd., Tokyo (JP)

( * ) Notice: Subject to any disclaimer, the term of this patent is extended or adjusted under 35 U.S.C. 154(b) by 52 days.

(21) Appl. No.: 15/123,266

(22) PCT Filed: Mar. 3, 2015

(86) PCT No.: PCT/JP2015/001128
§ 371 (c)(1),
(2) Date: Sep. 2, 2016

(87) PCT Pub. No.: WO2015/133131
PCT Pub. Date: Sep. 11, 2015

(65) Prior Publication Data
US 2017/0073605 A1 Mar. 16, 2017

(30) Foreign Application Priority Data
Mar. 4, 2014 (JP) ................. 2014-041980

(51) Int. Cl.
*F16C 33/20* (2006.01)
*C10M 145/20* (2006.01)
*C10M 169/04* (2006.01)
*C09D 161/06* (2006.01)
*C09D 163/00* (2006.01)
*C10M 103/06* (2006.01)
*C10M 107/38* (2006.01)
*F04B 35/00* (2006.01)
*F16J 1/01* (2006.01)
*F16N 15/00* (2006.01)
*F16J 9/26* (2006.01)
*F16D 69/00* (2006.01)
*F16D 69/02* (2006.01)
(Continued)

(52) U.S. Cl.
CPC ............ *C10M 145/20* (2013.01); *C09D 5/00* (2013.01); *C09D 7/61* (2018.01); *C09D 7/65* (2018.01); *C09D 161/06* (2013.01); *C09D 163/00* (2013.01); *C10M 103/00* (2013.01); *C10M 103/02* (2013.01); *C10M 103/06* (2013.01); *C10M 107/00* (2013.01); *C10M 107/30* (2013.01); *C10M 107/32* (2013.01); *C10M 107/38* (2013.01); *C10M 107/40* (2013.01); *C10M 111/04* (2013.01); *C10M 145/28* (2013.01); *C10M 169/04* (2013.01); *F04B 35/00* (2013.01); *F16C 33/201* (2013.01); *F16D 69/00* (2013.01); *F16D 69/025* (2013.01); *F16J 1/01* (2013.01); *F16J 9/26* (2013.01); *F16J 15/4472* (2013.01); *F16N 15/00* (2013.01); *C08K 3/36* (2013.01); *C08K 2003/2241* (2013.01); *C08K 2003/3009* (2013.01); *C08K 2003/382* (2013.01); *C09D 7/40* (2018.01); *C10M 107/04* (2013.01); *C10M 107/44* (2013.01); *C10M 2201/0413* (2013.01); *C10M 2201/0613* (2013.01); *C10M 2201/0623* (2013.01); *C10M 2201/0663* (2013.01); *C10M 2201/1006* (2013.01); *C10M 2201/1053* (2013.01); *C10M 2205/0225* (2013.01); *C10M 2209/1003* (2013.01); *C10M 2209/1013* (2013.01); *C10M 2209/1045* (2013.01); *C10M 2213/003* (2013.01); *C10M 2213/0623* (2013.01); *C10M 2217/0443* (2013.01); *C10N 2220/082* (2013.01); *C10N 2230/06* (2013.01); *C10N 2250/121* (2013.01); *F16C 33/208* (2013.01); *F16D 2200/0073* (2013.01)

(58) Field of Classification Search
CPC .................. C10M 2207/243; C10M 107/20
USPC .................................. 508/104, 106
See application file for complete search history.

(56) References Cited

U.S. PATENT DOCUMENTS

| 5,356,971 A | 10/1994 | Sagawa et al. |
| 8,097,569 B2 | 1/2012 | Saiki et al. |
(Continued)

FOREIGN PATENT DOCUMENTS

| CN | 1421501 A | 6/2003 |
| CN | 1537909 A | 10/2004 |
(Continued)

OTHER PUBLICATIONS

PCT/JP2015/001128 International Search Report dated Jun. 9, 2015, 4 pages.
(Continued)

*Primary Examiner* — Prem C Singh
*Assistant Examiner* — Francis C Campanell
(74) *Attorney, Agent, or Firm* — Warner Norcross & Judd LLP

(57) ABSTRACT

A coating composition for a lubricating coating film includes: (A) a phenolic resin; (B) an epoxy resin having an epoxy equivalent weight of 600 to 4000; and (C) at least one type of solid lubricant. The epoxy equivalent weight is generally defined by the number average molecular weight per the number of epoxy groups in a single molecule. The coating composition has a weight ratio of component (A) to the total weight of component (A) and component (B) of at least 50 weight %. A lubricating coating film, formed from the coating composition, has a high level of flexibility on surfaces of various base materials.

20 Claims, No Drawings

(51) Int. Cl.
*F16J 15/447* (2006.01)
*C10M 103/00* (2006.01)
*C10M 103/02* (2006.01)
*C10M 145/28* (2006.01)
*C10M 107/00* (2006.01)
*C10M 107/30* (2006.01)
*C10M 107/32* (2006.01)
*C10M 107/40* (2006.01)
*C10M 111/04* (2006.01)
*C09D 5/00* (2006.01)
*C09D 7/61* (2018.01)
*C09D 7/65* (2018.01)
*C10M 107/04* (2006.01)
*C10M 107/44* (2006.01)
*C08K 3/22* (2006.01)
*C08K 3/38* (2006.01)
*C08K 3/30* (2006.01)
*C09D 7/40* (2018.01)
*C08K 3/36* (2006.01)

(56) References Cited

U.S. PATENT DOCUMENTS

| | | | |
|---|---|---|---|
| 9,391,034 | B2 | 7/2016 | Noma et al. |
| 9,441,182 | B2 | 9/2016 | Jung et al. |
| 2004/0224856 | A1 | 11/2004 | Saiki et al. |
| 2012/0103183 | A1* | 5/2012 | Jung .............. C09D 161/06 92/172 |
| 2013/0109785 | A1* | 5/2013 | Endo .............. C09D 153/00 523/436 |
| 2014/0061889 | A1 | 3/2014 | Noma et al. |
| 2016/0260681 | A1 | 9/2016 | Noma et al. |

FOREIGN PATENT DOCUMENTS

| | | |
|---|---|---|
| CN | 10-2012-0016109 A | 2/2012 |
| CN | 102369251 A | 3/2012 |
| EP | 0976795 A2 | 2/2000 |
| EP | 1469050 A1 | 10/2004 |
| GB | 1585644 | 3/1981 |
| JP | S58145763 A | 8/1983 |
| JP | H08109352 A | 4/1996 |
| JP | 2000161426 A | 6/2000 |
| JP | 2004315618 A | 11/2004 |
| JP | 2005201289 A | 7/2005 |
| JP | 2012525457 A | 10/2012 |
| JP | 2013189569 A | 9/2013 |
| JP | 2014041980 A | 3/2014 |
| KR | 10-0583220 | 10/2004 |
| WO | WO9739073 A1 | 10/1997 |
| WO | WO2010125060 A1 | 11/2010 |
| WO | WO2013137399 A1 | 9/2013 |

OTHER PUBLICATIONS

English language abstract and machine translation for JPS58145763 (A) extracted from http://worldwide.espacenet.com database on Aug. 24, 2016, 7 pages.
English language abstract and machine translation for JPH08109352 (A) extracted from http://worldwide.espacenet.com database on Aug. 24, 2016, 14 pages.
English language abstract and machine translation for JP2000161426 (A) extracted from http://worldwide.espacenet.com database on Aug. 22, 2016, 11 pages.
English language abstract and machine translation for JP2005201289 (A) extracted from http://worldwide.espacenet.com database on Aug. 22, 2016, 14 pages.
English language abstract for WO2013137399 (A1) extracted from http://worldwide.espacenet.com database on Aug. 23, 2016, 2 pages.
English language abstract and machine translation for JP2013189569 (A) extracted from http://worldwide.espacenet.com database on Aug. 19, 2016, 22 pages.
English language abstract and machine translation for CN 1421501 A extracted from http://worldwide.espacenet.com database on Dec. 20, 2017, 7 pages.

* cited by examiner

COATING COMPOSITION FOR LUBRICATING COATING FILM

CROSS-REFERENCE TO RELATED APPLICATIONS

This application is the National Stage of International Application No. PCT/JP2015/001128 filed on 3 Mar. 2015, which claims priority to and all advantages of Japanese Patent Application No. 2014-041980 filed on 4 Mar. 2014, the content of which is hereby incorporated by reference.

TECHNICAL FIELD

The present invention relates to a coating composition for a lubricating coating film. Moreover, the present invention relates to a lubricating coating film obtained by curing the coating composition for a lubricating coating film, a sliding member provided with a lubricating coating film, and a method for manufacturing the sliding member.

BACKGROUND ART

As described in, for example, Japanese Unexamined Patent Application Publication No. 2013-189569, a sliding member provided with a binder including a phenolic resin and an epoxy resin and with a coating film including a solid lubricant is known.

However, in some cases, the abovementioned coating film lacks flexibility, and in such cases, adhesion between a base material and the coating film may be impaired. For example, if the abovementioned coating film is formed on a surface of a sheet shaped based material made of metal, the flexibility of the coating film is meagre, and therefore cracks can occur in the coating film during bending or such when processing the base material. Moreover, because the ability of the coating film to follow de-formation of the base material is meagre, when a location of a bend is scratched, the coating film may peel away.

The various disadvantages attributable to the low flexibility of the coating film with respect to this type of base material are particularly problematic with lubricating coating films that are formed for the purpose of lubrication on a surface of a sliding member that contacts another member for a long period of time.

CITATION LIST

Patent Literature

Patent Document 1: Japanese Unexamined Patent Application Publication No. 2013-189569

SUMMARY OF INVENTION

Technical Problem

An object of the present invention is to provide a coating composition for a lubricating coating film capable of forming a lubricating coating film having a high level of flexibility on surfaces of various base materials.

More specifically, an object of the present invention is to provide a coating composition for a lubricating coating film capable of forming a lubricating coating film having a high level of adhesion with the surfaces of various types of base materials, and particularly with the surfaces of base materials made of metal, and also having an excellent following capability, and capable of providing a sliding member that can maintain an excellent sliding characteristic for a long period of time through the lubricating coating film.

Moreover, another object of the present invention is to use the coating composition for a lubricating coating film to provide a lubricating coating film, a sliding member provided with the lubricating coating film, and a method for manufacturing the sliding member.

Solution to Problem

As a result of a detailed investigation to solve the abovementioned problems, the inventors of the present invention discovered that by controlling:
(i) the blending ratio of phenolic resin, which is a binder, and epoxy resin, and
(ii) the epoxy equivalent weight of the epoxy resin (defined by the number average molecular weight per the number of epoxy groups in a single molecule),
in a lubricating coating film including phenolic resin, epoxy resin, and a solid lubricant, a lubricating coating film having a high level of flexibility and exhibiting excellent adhesion with a base material and an excellent ability to follow the de-formation of a base material can be formed, and thereby arrived at the present invention.

Namely, a first object of the present invention is achieved by a coating composition for a lubricating coating film including:
(A) a phenolic resin,
(B) an epoxy resin having an epoxy equivalent weight of 600 to 4000, and
(C) at least one type of solid lubricant; and
a weight ratio of component (A) per the total weight of component (A) and component (B) is at least 50 weight %.

The epoxy equivalent weight of component (B) is alternatively 600 to 3300 or preferably 800 to 1200.

The weight ratio of component (A) per the total weight of component (A) and component (B) is preferably at least 60 weight % and not more than 80 weight %.

Component (C) may contain at least one or more types of substances selected from fluororesin, polyethylene resin, polyamide resin, and mixtures thereof.

Component (C) preferably contains one or more types of metal oxide or metal nitride selected from titanium nitride, titanium oxide, aluminum oxide, silicon nitride, silicon dioxide, and mixtures thereof.

Moreover, component (C) includes (C1) a fluororesin and (C2) one or more types of a metal oxide or metal nitride selected from titanium nitride, titanium oxide, aluminum oxide, silicon nitride, silicon dioxide, and mixtures thereof, and the weight ratio of component (C1) to component (C2) is preferably in a range of from 50:50 to 90:10.

The coating composition for a lubricating coating film of the present invention can contain 1 to 200 parts by weight of component (C) per 100 parts by weight of the total weight of component (A) and component (B).

The coating composition for a lubricating coating film of the present invention is used for forming a coating film.

The present invention also relates to a lubricating coating film obtained by curing the coating composition for a lubricating coating film.

The lubricating coating film of the present invention is obtained by curing the coating composition for a lubricating coating film, and the Erichsen value (JIS Z 2247) when the coating composition for a lubricating coating film is cured at a film thickness of 10 to 20 micro-meters is preferably 8.0 mm or greater.

The present invention also relates to a sliding member provided with the lubricating coating film.

The sliding member can be a crankshaft, compressor shaft, slide bearing, gear, oil pump gear, piston, piston ring, piston pin, gasket, door lock, guide rail, seatbelt buckle, brake pad, brake pad clip, brake shim, brake insulator, hinge, screw, or pressurization pad.

The present invention also relates to a method for manufacturing a sliding member provided with a base material having the lubricating coating film formed on a surface, the method thereof including:

a step of applying the coating composition for a lubricating coating film onto a surface of the base material, and a step of heating the coating composition for a lubricating coating film to form a lubricating coating film on the surface of the base material.

The base material preferably contains metal.

The method for manufacturing a sliding member of the present invention may further include a step of pressing or punching the base material having the lubricating coating film formed on a surface thereof.

The sliding member can be a crankshaft, compressor shaft, a slide bearing, gear, oil pump gear, piston, piston ring, piston pin, gasket, door lock, guide rail, seatbelt buckle, brake pad, brake pad clip, brake shim, brake insulator, hinge, screw, or pressurization pad.

The present invention also relates to formation of a lubricating coating film by curing the coating composition for a lubricating coating film on a sliding member. Specific examples of the sliding member are preferably those described above.

Advantageous Effects of Invention

The coating composition for a lubricating coating film according to the present invention can form a lubricating coating film having a high level of flexibility on surfaces of various types of base materials.

In particular, the coating composition for a lubricating coating film of the present invention can form a lubricating coating film having a high level of adhesion even with a base material made from a deformable substance such as metal, and because the following capability of the lubricating coating film is high, the generation of cracking in the lubricating coating film and/or peeling of the lubricating coating film from the base material can be avoided or reduced.

The lubricating coating film obtained through the coating composition for a lubricating coating film of the present invention contains a solid lubricant, and therefore the lubricating coating film is provided with an excellent sliding characteristic. Moreover, the lubricating coating film obtained through the coating composition for a lubricating coating film of the present invention exhibits a high level of flexibility, and therefore it functions as a lubricating coating film with superior sliding durability. Accordingly, a lubricating coating film formed on a surface of a base material through the coating composition for a lubricating coating film according to the present invention can maintain an excellent sliding characteristic for a long period of time.

The lubricating coating film of the present invention is highly flexible and exhibits excellent adhesion and following capability, and therefore, for example, if the above-described coating film is formed on the surface of a base material having a sheet, film, or plate form, even if the base material is bent or the like, cracking of the coating film and peeling of the coating film from the base material will not occur or the extent thereof will be minimal. Accordingly, after a lubricating coating film is formed on a surface of a base material according to the present invention, the base material can be moulded to manufacture a sliding member, and a sliding member can be efficiently manufactured.

Hence, with the method for manufacturing a sliding member of the present invention, a sliding member having a lubricating coating film with a high level of flexibility and with excellent adhesion and following capability can be easily produced, and the productivity of a sliding member can be improved.

In particular, if a base material is made of metal, after a lubricating coating film has been formed on the surface of the base material, a sliding member can be manufactured by pressing, punching, or the like the base material, and the sliding member can be efficiently manufactured. Examples of this type of sliding member include a crankshaft, compressor shaft, slide bearing, gear, oil pump gear, piston, piston ring, piston pin, gasket, door lock, guide rail, seatbelt buckle, brake pad, brake pad clip, brake shim, brake insulator, hinge, screw, or pressurization pad.

Moreover, if the coating composition for a lubricating coating film of the present invention preferably contains, as component (C), fluororesin and microparticles including one or more types of metal oxide or metal nitride selected from titanium nitride, titanium oxide, aluminum oxide, silicon nitride, silicon dioxide, and mixtures thereof, the coefficient of friction of the resulting lubricating coating film can be further reduced, and the wear resistance of the lubricating coating film under high load conditions can be further increased.

DESCRIPTION OF EMBODIMENTS

A first embodiment of the present invention is a coating composition for lubricating coating film including:

(A) a phenolic resin, (B) an epoxy resin having an epoxy equivalent weight of 600 to 4000 (defined by the number average molecular weight per the number of epoxy groups in a single molecule), and (C) at least one type of solid lubricant; and a ratio of the weight % of component (A) per the total weight % of component (A) and component (B) is at least 50 weight %.

<Component (A)>

The composition of the present invention contains phenolic resin as component (A). Component (A) may be a single type of phenolic resin, or may be a mixture of two or more types thereof.

The phenolic resin is a resin obtained by a condensation reaction of phenol, cresol, bisphenol A, or other phenolic compounds and formaldehyde or another aldehyde in the presence of an acidic catalyst or a basic catalyst, and of these, phenolic resins condensed with an acidic catalyst are called novolac-type phenolic resins, and those condensed with a basic catalyst are called resol-type phenolic resins.

The phenolic resin as component (A) is not particularly limited, and either a novolac-type phenolic resin or a resol-type phenolic resin may be used, but a resol-type phenolic resin is preferred. Moreover, a resin in which methylol groups are introduced is included, and a phenolic resin having a portion or all of the introduced methylol groups alkyl-etherified with an alcohol having 6 or fewer carbon atoms can be used.

A commercially available phenolic resin can be used as the phenolic resin. Examples of commercially available phenolic resins include Sumilite Resin PR-HF-3, Sumilite Resin PR-HF-6, Sumilite Resin PR-53194, Sumilite Resin PR-53195, Sumilite Resin PR-54869, Sumilite Resin PR-16382, Sumilite Resin PR-51939, Sumilite Resin PR53153, Sumilite Resin PR-53364, Sumilite Resin PR-53365, and Sumilite Resin PR50702 (all produced by Sumitomo Bakelite Co., Ltd.); Phenolite TD-2131, Phenolite TD-2106, Phenolite TD-2093, Phenolite TD-2091, Phenolite TD-2090, Phenolite VH4150, Phenolite VH-4170, Phenolite VH-4240, Phenolite KH-1160, Phenolite KH1163, Phenolite KH-1165, Phenolite TD-2093-60M, Phenolite TD-2090-60M, Phenolite LF-4711, Phenolite LF-6161, Phenolite LF-4871, Phenolite LA-7052, Phenolite LA-7054, Phenolite LA-7751, Phenolite LA-1356, and Phenolite LA3018-50P (the above are produced by DIC Corporation); Shonol BRG-555, Shonol BRG-556, Shonol BRG-558, Shonol CKM-923, Shonol CKM-983, Shonol BKM2620, Shonol BRL-2854, Shonol BRG-5590M, Shonol CKS-3898, Shonol CKS-3877A, Shonol CKM-908, and Shonol CKM-937 (the above are produced by "Showa Highpolymer Co., Ltd").

In the present invention, a preferable phenolic resin is a resol-type phenolic resin having a hydroxyl group equivalent in a range of 80 to 200 g/eq, and a resol-type phenolic resin having a hydroxyl group equivalent in a range of 100 to 130 g/eq is particularly preferred.

The amount of component (A) in the composition of the present invention is 50 weight % or greater based on the total weight % of components (A) and (B) in the composition, but 55 weight % or greater is preferable, 60 weight % or greater is more preferable, and 65 weight % or greater is even more preferable. If the amount of component (A) in the composition of the present invention is less than the abovementioned lower limit based on the total weight % of components (A) and (B) in the composition, even if the below-described component (B) is used, for example, the flexibility of the obtained lubricating coating film will be insufficient (Erichsen value of less than 8.0 mm).

A high level of flexibility can be imparted to the lubricating coating film obtained from the composition of the present invention by setting the amount of component (A) in the composition of the present invention to be 50 weight % or greater based on the total weight % of components (A) and (B) in the composition, and combining this with other conditions.

On the other hand, the amount of component (A) in the composition of the present invention is preferably not more than 85 weight %, more preferably not more than 80 weight %, even more preferably not more than 75 weight %, and particularly preferably not more than 70 weight % based on the total weight % of components (A) and (B) in the composition.

Accordingly, the amount of component (A) in the composition of the present invention can be, for example, 50 to 85 weight %, 50 to 80 weight %, 50 to 75 weight %, or 50 to 70 weight % based on the total weight % of components (A) and (B) in the composition. More particularly, the amount thereof is preferably in a range of not less than 60 weight % to not more than 80 weight %.

<Component (B)>

The composition of the present invention contains epoxy resin having an epoxy equivalent weight of 600 to 4000 as component (B). Component (B) may be a single type of epoxy resin, or a mixture of two or more types thereof.

The epoxy equivalent weight is defined by the number average molecular weight per the number of epoxy groups in a single molecule. If the number of epoxy groups in a single molecule of epoxy resin is one, the value of that number average molecular weight is the epoxy equivalent weight. If the number of epoxy groups in a single molecule of epoxy resin is two or more, the number average molecular weight of the epoxy resin divided by the number of epoxy groups is the epoxy equivalent weight. Note that the epoxy equivalent weight of epoxy resin can also be determined by the method described by JIS K 7236.

The epoxy resin of component (B) has an epoxy equivalent weight of 600 to 4000, but an epoxy equivalent weight of 600 to 3300 is preferable, an epoxy equivalent weight of 800 to 1200 is more preferable, and from the perspective of improving flexibility, an epoxy equivalent weight of 850 to 1100 is most preferable. A high level of flexibility with an Erichsen value of 8.0 mm or greater can be imparted to the lubricating coating film resulting from the cure of the composition of the present invention by setting the epoxy equivalent weight of component (B) in the composition of the present invention to be in a range of 600 to 4000, and combining this with other conditions. However, if the epoxy equivalent weight of component (B) is less than the abovementioned lower limit or exceeds the abovementioned upper limit, the flexibility of the obtained lubricating coating film will be insufficient (Erichsen value of less than 8.0 mm)

If a plurality of epoxy resins are used as component (B), and if the total amount of each epoxy resin is designated by A (parts by weight), the amount of each epoxy resin is designated by $A_x$ (parts by weight), and the epoxy equivalent weight of each epoxy resin is designated by $M_x$, then in this case, the epoxy equivalent weight of component (B) is the summation of $M_x \times (A_x/A)$.

Accordingly, even if an epoxy resin by itself does not have an epoxy equivalent weight that corresponds to a range of 600 to 4000, if the epoxy resin is mixed and used with another epoxy resin, resulting in an overall epoxy equivalent weight of 600 to 4000, the epoxy resin thereof can be used as a structural component of component (B). However, use of a mixture of epoxy resins for which the epoxy equivalent weights of the single epoxy resins correspond to a range of 600 to 4000 as component (B) is preferred.

The epoxy resin is not particularly limited, and one or more types may be selected and used including bisphenol based epoxy resin, amine based epoxy resin, phenol novolac based epoxy resin, cresol novolac based epoxy resin, resorcinol based epoxy resin, phenol aralkyl based epoxy resin, naphthol aralkyl based epoxy resin, dicyclopentadiene based epoxy resin, epoxy resin having a biphenyl backbone, isocyanate modified epoxy resin, tetraphenyl ethane based epoxy resin, triphenyl methane based epoxy resin, fluorene based epoxy resin, and the like.

Generally, bisphenol based epoxy resin is an epoxy resin for which two phenolic hydroxyl groups of a bisphenol compound have been glycidylated, and examples include a bisphenol A type, a bisphenol F type, a bisphenol AD type, a bisphenol S type, or halogen or alkyl substitutes, hydrogenated products, dimer acid-modified products, or the like of these bisphenols. Moreover, the bisphenol based epoxy resin is not limited to monomers, and polymers having a plurality of repeating units can also be favourably used.

Examples of commercially available bisphenol A type epoxy resin include "jER (registered trademark)" 825, 828, 834, 1001, 1002, 1003, 1003F, 1004, 1004AF, 1005F, 1006FS, 1007, 1009, and 1010 (the above-described are products of Mitsubishi Chemical Corporation), and the like. Examples of brominated bisphenol A type epoxy resin include "jER (registered trademark)" 505, 5050, 5051, 5054, and 5057 (the above-described are products of Mitsubishi Chemical Corporation), and the like. Examples of commercially available hydrogenated bisphenol A type epoxy resin include ST5080, ST4000D, ST4100D, and ST5100 (the above-described are products of the Nippon Steel Chemical Co., Ltd.).

Examples of commercially available bisphenol F type epoxy resin products include "jER (registered trademark)" 806, 807, 4002P, 4004P, 4005P, 4007P, 4009P, and 4010P (the above-described are products of Mitsubishi Chemical Corporation), "Epototo (registered trademark)" YDF2001 and YDF2004 (the above-described are products of the Nippon Steel Chemical Co., Ltd.), and the like. Examples of tetramethyl bisphenol F type epoxy resin include YSLV-80XY (product of the Nippon Steel Chemical Co., Ltd.), and the like.

Examples of bisphenol S type epoxy resin include "Epiclon (registered trademark)" EXA-154 (from DIC Corporation), and the like.

Examples of amine based epoxy resin include tetraglycidyl diaminodiphenyl methane, triglycidyl aminophenol, triglycidyl aminocresol, tetraglycidyl xylylene diamine, and halogen or alkynol substitutes, hydrogenated products, or the like of these.

Examples of the tetraglycidyl diaminodiphenyl methane include "SumiEpoxy (registered trademark)" ELM434 (from Sumitomo Chemical Co., Ltd.), YH434L (from Nippon Steel Chemical Co., Ltd.), "jER (registered trademark)" 604 (from Mitsubishi Chemical Corporation), "Araldite (registered trademark)" MY720 and MY721 (the above-described are products of Huntsman Advanced Materials), and the like. Examples of triglycidyl aminophenol and triglycidyl aminocresol include "SumiEpoxy (registered trademark)" ELM100 and ELM120 (the above-described are products of Sumitomo Chemical Co., Ltd.), "Araldite (registered trademark)" MY0500, MY0510, and MY0600 (the above-described are products of Huntsman Advanced Materials), "jER (registered trademark)" 630 (Mitsubishi Chemical Corporation), and the like. Examples of tetraglycidyl xylylene diamine and hydrogenated products thereof include TETRAD-X and TETRAD-C (the above-described are products of the Mitsubishi Gas Chemical Company, Inc.), and the like.

Examples of commercially available products of phenol novolac based epoxy resin include "jER (registered trademark)" 152 and 154 (the above-described are products of Mitsubishi Chemical Corporation), "Epiclon (registered trademark)" N-740, N-770, and N-775 (the above-described are products of DIC Corporation), and the like.

Examples of commercially available products of cresol novolac based epoxy resin include "Epiclon (registered trademark)" N-660, N-665, N-670, N-673, and N-695 (the above-described are products of DIC Corporation), EOCN-1020, EOCN-1025, and EOCN-1045 (the above-described are products of Nippon Kayaku Co., Ltd.), and the like.

Specific examples of resorcinol based epoxy resin include "Denacol (registered trademark)" EX-201 (from Nagase ChemteX Corporation), and the like.

Examples of commercially available products of dicyclopentadiene based epoxy resin include "Epiclon (registered trademark)" HP-7200, HP-7200L, HP-7200H, HP7200HH, and HP-7200HHH (the above-described are products of DIC Corporation), "Tactix (registered trademark)" 558 (from Huntsman Advanced Materials), XD-1000-1L and XD-1000-2L (the above-described are products of Nippon Kayaku Co., Ltd.), and the like.

Examples of commercially available products of epoxy resin having a biphenyl backbone include "jER (registered trademark)" YX4000H, YX4000, and YL6616 (the above-described are products of Mitsubishi Chemical Corporation), NC-3000 (from Nippon Kayaku Co., Ltd.), and the like.

Examples of commercially available products of isocyanate modified epoxy resin include AER4152 and XAC4151 with an oxazolidone ring (from Asahi Kasei Epoxy Co., Ltd.) and ACR1348 (from ADEKA Corporation), and the like.

Examples of commercially available tetraphenyl ethane based epoxy resin products include the tetrakis(glycidyl oxyphenyl)ethane based epoxy resin "jER (registered trademark)" 1031 (from Mitsubishi Chemical Corporation), and the like.

Examples of commercially available products of triphenyl methane based epoxy resin include "jER (registered trademark)" 1032S50 (from Mitsubishi Chemical Corporation), "Tactix (registered trademark)" 742 (from Huntsman Advanced Materials), and the like.

Examples of commercially available fluorene based epoxy resin products include "OGSOL (registered trademark)" (from Osaka Gas Chemicals Co., Ltd.), LME10169 (from Huntsman Advanced Materials), and the like.

From the viewpoint of heat resistance, modulus of elasticity, and other dynamic properties, the epoxy resin may also be an epoxy resin containing an epoxy resin having a functionality of 3 or higher.

Examples of epoxy resins having a functionality of 3 or higher include tetraglycidyl diaminodiphenyl methane, triglycidyl aminophenol, triglycidyl aminocresol, tetraglycidyl xylylene diamine, and halogen or alkynol substitutes and hydrogenated products thereof, phenol novolac based epoxy resin, cresol novolac based epoxy resin, dicyclopentadiene based epoxy resin with a functionality of 3 or higher, tetraphenyl ethane based epoxy resin, triphenyl methane based epoxy resin, and the like.

Component (B) is preferably an epoxy resin having an epoxy equivalent weight in a range of 600 to 4000 on an independent basis, and examples of such epoxy resins include the commercially available bisphenol A epoxy resin products of "jER (registered trademark)" 872, 1001, 1002, 1003, 1003F, 1004, 1004AF, 1005F, 1006FS, 1007, and 1007FS (the above-described are products of Mitsubishi Chemical Corporation), "Epiclon (registered trademark)" 1050, 1055, 2050, 3050, 4050, and 7050 (the above-described are products of DIC Corporation), brominated bisphenol A type epoxy resins of "jER (registered trademark)" 153, 153-60T, 153-60M, 1121N-80M, and 1123P-75M (the above-described are products of Mitsubishi Chemical Corporation), the commercially available bisphenol F epoxy resin products of "jER (registered trademark)" 4004P, 4005P, 4007P, and 4010P (the above-described are products of Mitsubishi Chemical Corporation), and the like.

The epoxy resin may also be a rubber-modified epoxy resin. An example of a rubber-modified epoxy resin includes CTBN (carboxy-terminated butadiene-nitrile rubber) modified epoxy resin. An example of a commercially available CTBN-modified epoxy resin having an epoxy equivalent weight in a range of 600 to 4000 on an independent basis includes Epiclon TSR-601 (from DIC Corporation) and the like.

The amount of component (B) in the composition of the present invention is 50 weight % or less based on the total weight % of components (A) and (B) in the composition, but 45 weight % or less is preferable, 40 weight % or less is more preferable, and 35 weight % or less is even more preferable.

On the other hand, the amount of component (B) in the composition of the present invention is preferably at least 15 weight % based on the total weight % of components (A) and (B) in the composition, more preferably at least 20 weight %, even more preferably at least 25 weight %, and particularly preferably at least 30 weight %.

Accordingly, the amount of component (B) in the composition of the present invention can be, for example, 15 to 50 weight %, 20 to 45 weight %, 25 to 40 weight %, or 30 to 40 weight % based on the total weight % of components (A) and (B) in the composition. In particular, the amount thereof is preferably at least 20 weight % and not more than 40 weight % based on the total weight % of components (A) and (B) in the composition.

Note that components (A) and (B) are thermosetting resin components that become a binder for the hereinafter described component (C), and the thermosetting resin component substantially preferably includes only component (A) and component (B).

<Component (C)>

The composition of the present invention contains at least one type of solid lubricant as component (C). By containing a solid lubricant in this manner, the composition of the present invention can form a highly lubricative coating film on a base material surface, and the lubricating coating film can maintain an excellent sliding characteristic for a long period of time. Accordingly, as a coating composition for a lubricating coating film, the composition of the present invention containing component (C) can impart a lubricating coating film exhibiting a high level of adhesion and excellent sliding durability.

The solid lubricant is not particularly limited, and a single type of solid lubricant may be used, or two or more types thereof may be used in combination.

The solid lubricant is in a particle form, and the average (median) particle size thereof is preferably not more than 15 micro-meters, and is more preferably from 0.2 to 12 micrometers. Note that the average particle size referred to herein means the volume average particle size measured using a laser diffraction type particle size distribution measuring apparatus.

Examples of the solid lubricant include microparticles of organic compounds including fluororesin (particularly polytetrafluoroethylene, tetrafluoroethylene-hexafluoropropylene copolymer, and the like), polyethylene resin, polyamide resin, and the like, microparticles of inorganic compounds including titanium nitride, titanium oxide, molybdenum disulfide, graphite, aluminum oxide, silicon nitride, boron nitride, silicon dioxide, zinc oxide, and the like, microparticles of metals such as lead, and mixtures thereof.

From the perspective of improving wear resistance of the lubricating coating film under high load conditions, the composition of the present invention preferably contains, as a solid lubricant, one or more types of metal oxide or metal nitride selected from titanium nitride, titanium oxide, aluminum oxide, silicon nitride, silicon dioxide, and mixtures thereof, and more preferably contains a fluororesin as a component (C1), and one or more types of metal oxide or metal nitride selected from titanium nitride, titanium oxide, aluminum oxide, silicon nitride, silicon dioxide, and mixtures thereof as a component (C2). The coefficient of friction of the lubricating coating film obtained by the composition of the present invention can be further reduced, and the wear resistance of the lubricating coating film under high load conditions can be further increased particularly by using microparticles of a fluororesin, which is component (C1), in conjunction with a specific metal oxide or metal nitride that is component (C2).

When the solid lubricant includes the (C1) component of fluororesin and the (C2) component including one or more types of metal oxide or metal nitride selected from titanium nitride, titanium oxide, aluminum oxide, silicon nitride, silicon dioxide, and mixtures thereof, the weight % ratio of component (C1) and component (C2) is not particularly limited, but is preferably in a range of 50:50 to 90:10, and particularly preferably in a range of 60:40 to 85:15.

From the perspective of improving wear resistance, microparticles of the (C1) fluororesin are preferably used in combination with microparticles of metal oxide or metal nitride of the (C2) component at the abovementioned weight ratio.

If the composition of the present invention contains a combination of microparticles including the above-described specific solid lubricant, the coefficient of friction of the lubricating coating film obtained through the composition of the present invention can be further reduced, and the wear resistance of the lubricating coating film under high load conditions can be further increased.

Note that if a black coloured to coloured solid lubricant such as molybdenum disulfide, graphite, or titanium nitride is blended in the composition of the present invention, the composition can be particularly favourably cured through heating.

The composition of the present invention can contain component (C) at an amount of 1 to 200 parts by weight per 100 parts by weight of the total weight of components (A) and (B).

If component (C) is an organic solid lubricant, the composition of the present invention preferably contains component (C) at an amount of 1 to 100 parts by weight, and more preferably 10 to 50 parts by weight per 100 parts by weight of the total weight of components (A) and (B).

If component (C) is an inorganic solid lubricant, the composition of the present invention preferably contains component (C) at an amount of 1 to 50 parts by weight, and more preferably 2 to 20 parts by weight per 100 parts by weight of the total weight of components (A) and (B).

In addition to components (A) to (C), the composition of the present invention may also contain, as appropriate, various other components according to the application within a scope that does not hinder the technical effects of the present invention.

For example, the composition of the present invention can contain a thermosetting resin including an organic resin curable by heat other than components (A) and (B) or mixtures thereof. The chemical reaction involved in the curing is not particularly limited, and the thermosetting resin thereof may be one cured by condensation polymerization, one cured by radical addition polymerization, or a mixture thereof.

The thermosetting resin may be curable at normal temperature (approximately 25 C), or may be curable by heating (approximately 30 C or greater). Furthermore, a plurality of thermosetting resins may be mixed and used.

Examples of the thermosetting resin include urethane resin, urea resin, melamine resin, unsaturated polyester resin, polyimide resin, polyamide-imide resin, diallyl phthalate resin, silicone resin, and the like, and mixtures thereof. From the perspective of being able to further improve the heat resistance of the lubricating coating film, use of a polyamide-imide resin or the like as the thermosetting resin is more preferable. Furthermore, from the perspective of being able to further improve adhesiveness with a base material, the use of urethane resin or the like is preferred. Adhesiveness with the base material and flexibility can be further improved by using urethane resin.

The type of urethane resin is not particularly limited, but a urethane resin obtained by reacting (c1) at least one type of polyol and (c2) at least 1 type of isocyanate is preferred.

The (c1) polyol is not particularly limited as long as it has two or more hydroxyl groups in a single molecule, and a conventionally known polyol can be used. Examples include polyester polyol, polycarbonate polyol, polyether polyol, poly caprolactone polyol, polyalkylene polyol, and the like. The polyol may be used singularly, or two or more types may be used in combination.

Examples of the polyester polyol include polyester polyol obtained through a condensation polymerization reaction of polyvalent carboxylic acid and polyol. Examples of the polyvalent carboxylic acid include succinic acid, terephthalic acid, isophthalic acid, dodecanedioc acid, 1,5-naphthalate, 2,6-naphthalate, succinic acid, glutaric acid, adipic acid, pimelic acid, suberic acid, azelaic acid, sebacylic acid, dodecamethylene dicarboxylate, and other dicarboxylic acids, and the like. As the polyvalent carboxylic acid, straight-chain dicarboxylic acids are preferred, and the number of carbon atoms of the straight-chain dicarboxylic acid is preferably 4 or more, and 4 to 12 carbon atoms is more preferable. Moreover, the number of carbon atoms of the straight-chain dicarboxylic acid is most preferably an even number. Specific examples of this type of straight-chain dicarboxylic acid include succinic acid, adipic acid, suberic acid, sebacylic acid, dodecanedioic acid, and the like. Moreover, examples of the polyol include propylene glycol, 1,3-propanediol, 1,4-butanediol, neopentyl glycol, 1,5-pentanediol, 1,6-hexanediol, ethylene glycol, diethylene glycol, cyclohexanediol, and the like. The polyvalent carboxylic acid and the polyol may each be used singularly, or two or more types thereof may be used in combination. The hydroxyl value of the polyester polyol is preferably 2 to 160 mgKOH/g.

The polycarbonate polyol is a compound having repeating units expressed by the formula —R—O(C=O)O— (wherein, R represents a divalent aliphatic or alicyclic hydrocarbon group having 2 to 5 carbon atoms) and two or more hydroxyl groups, and examples include polyhexamethylene carbonate polyol, polycyclohexane dimethylene carbonate polyol, and the like.

Polycarbonate diol is a compound having the abovementioned repeating units and two hydroxyl groups in a molecule. Polycarbonate diol can be synthesized from aliphatic and/or alicyclic diol through the various methods described in Polymer Review Vol. 9 (1964), pages 9 to 20 by Schell. Examples of preferable diols include ethylene glycol, 1,2-propanediol, 1,3-propanediol, 1,2-butanediol, 1,3-butanediol, 1,4-butanediol, neopentyl glycol, 2,3-butane diol, 1,5-pentane diol, 1,6-hexane diol, 2,5-hexane diol, 1,4-cyclohexane diol, 1,4-cyclohexane dimethanol, and the like.

The range of the average molecular weight of the polycarbonate diol is ordinarily 500 to 5000 in terms of the number average molecular weight, and a polycarbonate diol having an average molecular weight of 1000 to 3000 is preferably used, and preferably, the polymer ends thereof are substantially all hydroxyl groups. In the present invention, in addition to the diol presented above, a polycarbonate that has been polyfunctionalized by using a small amount of a compound having 3 or more hydroxyl groups in a single molecule, for example, trimethylol ethane, trimethylol propane, hexanetriol, pentaerythritol, and the like, may also be used.

Examples of the polyether polyol include polyethylene glycol, polypropylene glycol, polytetramethylene glycol, random copolymers or block copolymers thereof, and a polyoxyalkylene modified form of bisphenol A.

An example of a polycaprolactone polyol is a polycaprolactone polyol obtained by ring-opening addition polymerization of a lactone compound to a polyol. As the polyol, the same polyols as those described above with the polyester polyol may be used. Furthermore, examples of the lactone compound include beta-propiolactone, pivalolactone, delta-valerolactone, epsilon-caprolactone, methyl-epsilon-caprolactone, dimethyl-epsilon-caprolactone, trimethyl-epsilon-caprolactone, and the like.

Examples of polyalkylene polyol include polybutadiene polyol, hydrogenated polybutadiene polyol, hydrogenated polyisoprene polyol, and the like.

As the (c1) polyol, polyester polyol or polycarbonate polyol is preferable, polycarbonate polyol is more preferable, and polycarbonate diol is even more preferable.

The (c2) isocyanate is not particularly limited as long as it has an isocyanate group in a single molecule, and a conventionally known isocyanate can be used. However, as the isocyanate, polyisocyanate having two or more isocyanate groups in a single molecule is preferable. A single type of isocyanate may be used, or two or more types may be used in combination.

Examples of the polyisocyanate include 4,4'-diphenylmethane diisocyanate (4,4'-MDI), 2,4-diphenylmethane diisocyanate (2,4-MDI), 2,2'-diphenylmethane diisocyanate (2,2'-MDI), carbodiimide-modified diphenylmethane diisocyanate, polymethylene polyphenyl polyisocyanate, carbodiimidized diphenylmethane polyisocyanate, tolylene diisocyanate (TDI, 2,4-TDI, 2,6-TDI, or mixtures thereof), xylylene diisocyanate (XDI), 1,5-naphthalene diisocyanate (NDI), tetramethylxylene diisocyanate, phenylene diisocyanate, hexamethylene diisocyanate (HDI), dimer acid diisocyanate, norbornene diisocyanate, lysine diisocyanate, xylylene diisocyanate, tetramethylxylylene diisocyanate, isophorone diisocyanate (IPDI), hydrogenated diphenylmethane diisocyanate (hydrogenated MDI), hydrogenated xylylene diisocyanate (hydrogenated XDI), cyclohexane diisocyanate, dicyclohexylmethane diisocyanate, isophorone diisocyanate, and the like.

As the polyisocyanate, diisocyanate or triisocyanate are preferred. Examples of diisocyanate and triisocyanate include isophorone diisocyanate, tolylene diisocyanate, 4,4'-diphenylmethane diisocyanate, naphthylene diisocyanate, xylylene diisocyanate, phenylene diisocyanate, 3,3'-dichloro-4,4'-phenylmethane diisocyanate, toluylene diisocyanate, hexamethylene diisocyanate, 4,4'-dicyclohexylmethane diisocyanate, hydrogenated xylylene diisocyanate, triphenylmethane triisocyanate, tetramethylxylene diisocyanate, hydrogenated 4,4'-diphenylmethane diisocyanate, and the like.

The urethane resin is more preferably a polycarbonate based urethane resin obtained by reacting (c1-1) polycarbonate polyol and (c2-1) diisocyanate.

The amount of the thermosetting resin in the composition of the present invention may be, for example, 1 to 50 weight %, 2 to 45 weight %, or 3 to 30 weight % based on the total weight % of the composition including the solvent, pigment, and the like.

However, the thermosetting resin in the composition of the present invention substantially includes only component (A) and component (B), and thus the amount of the thermosetting resin is preferably 3 to 30 weight %, and preferably 5 to 20 weight % based on the total weight % of the composition.

Components (A) and (B) are thermosetting resin components that become a binder for component (C) and the like, and from the perspective of the technical effects of the present invention, the thermosetting resin component preferably includes substantially only component (A) and component (B). If other thermosetting resin components are contained at an amount of 10 weight % or more with respect to the sum of component (A) and (B), the technical effects of the present invention could be lost in some cases.

If the composition of the present invention contains a radical-polymerizable thermosetting resin, the composition of the present invention is preferably further blended with a radical thermal polymerization initiator. By including a radical polymerization initiator, curing can be achieved in a short period of time, the generation of heat at the time of curing can be suppressed, and the impact on the base material can be reduced.

Examples of radical thermal polymerization initiators include ammonium persulfate, potassium persulfate, hydrogen peroxide, azobisisobutyronitrile, dibutyl peroxide, benzoyl peroxide, 1,1'-azobis(1-acetoxy-1-phenyl ethane), and the like. The radical thermal polymerization initiator may be used singularly, or as a combination of two or more types.

The blending amount of the radical polymerization initiator may be, for example, 0.1 to 5 weight % based on the total weight % of the composition of the present invention.

Moreover, the composition of the present invention can also contain, for example, at least one type of film-forming auxiliary agent. An example of a film-forming auxiliary agent includes epoxy silane or the like. With the present invention, a single film-forming auxiliary agent may be used independently, or a plurality of film-forming auxiliary agents may be used in combination. When epoxy silane is used as a film-forming auxiliary agent, it can be used, for example, in a range of 0.1 to 5 weight % based on the total weight % of the composition of the present invention.

Moreover, the composition of the present invention can contain at least one type of solvent. With the present invention, a single type of solvent may be used independently, or a plurality of solvents may be used in combination. The solvent is not particularly limited, but organic solvents such as methyl ethyl ketone, methyl isobutyl ketone, cyclohexanone, dimethylformamide (DMF), chloroform, dichloromethane, chlorobenzene, dichlorobenzene, N-methylpyrrolidone (NMP), toluene, dioxane, propanol, gamma-picoline, acetonitrile, dimethyl sulfoxide (DMSO), dimethylacetamide (DMAC), and the like are preferred, methylethylketone, methyl isobutyl ketone, cyclohexanone, and other ketone based organic solvents are more preferred. The solvent can be appropriately used, for example, in a range of 10 to 800 parts by weight, preferably 20 to 600 parts by weight, and more preferably 30 to 500 parts by weight based on 100 parts by weight of the total weight of components (A) and (B) of the composition of the present invention.

Moreover, the composition of the present invention can contain at least one type of silicone rubber. With the present invention, a single type of silicone rubber may be used independently, or a plurality of silicone rubbers may be used in combination. The temperature dependency of the viscosity of the composition of the present invention can be reduced by blending silicone rubber with the composition thereof. A conventionally known silicone rubber can be appropriately used as the silicone rubber, and for example, the silicone rubber can be used in a range of 0.001 to 3 weight % based on the total weight % of the composition of the present invention.

Moreover, the composition of the present invention can contain at least one type of antifoaming agent. With the present invention, a single type of antifoaming agent may be used independently, or a plurality of antifoaming agents may be used in combination. Foaming during application of the composition of the present invention can be suppressed by blending the composition thereof with an antifoaming agent, thereby facilitating application work. As the antifoaming agent, a conventionally known agent can be appropriately used, and for example, the antifoaming agent can be used in a range of 0.00001 to 1 weight % based on the total weight % of the composition of the present invention.

Moreover, the composition of the present invention can contain at least one type of thickening agent. With the present invention, a single type of thickening agent may be used independently, or a plurality of thickening agents may be used in combination. The viscosity of the composition can be increased to thereby reduce dripping during application by blending the composition thereof with a thickening agent, thereby facilitating application work. As the thickening agent, a conventionally known agent can be appropriately used, and for example, the thickening agent can be used in a range of 0.001 to 1 weight % based on the total weight % of the composition of the present invention.

Furthermore, the composition of the present invention may also contain other components within a range that does not hinder the effect of the present invention. Examples of other components include a release agent, surface treatment agent, fire retardant, levelling agent, antifoaming agent, thixotropic agent, thermal stabilizer, light stabilizer, ultraviolet absorbing agent, colouring agent, coupling agent, metal alkoxide, and the like. For example, the composition of the present invention can contain carbon black or another pigment as a colouring agent in a range of 0.1 to 5 weight % based on the total weight % of the composition (100%).

The composition of the present invention can be produced by appropriately mixing components (A) to (C) and the various other abovementioned optional components.

The composition of the present invention can be favourably used as a coating composition for a lubricating coating film in the formation of a lubricating coating film and can form a lubricating coating film having a high level of flexibility on the surfaces of various base materials.

The material of the base material is not particularly limited, and for example, iron, aluminum, copper, or another metal, rubber, resin, and the like, and combinations thereof can be used. The base material preferably contains metal, and is more preferably made of metal. The surface of the base material may be subjected to a surface roughening treatment through electrolytic etching, chemical etching, shot blast, or the like, or may be subjected to a chemical treatment through phosphate or the like in order to improve adhesiveness as needed.

With the present invention, a coating film can be formed on a surface of a base material by applying the already-described coating composition for a lubricating coating film onto a surface of the base material, and then curing the composition by heating.

The method for applying the coating composition for lubricating coating film onto a surface of a base material is not particularly limited, and for example, conventionally known application methods can be used such as roll coating, coil coating, screen printing, spraying, tumbling, immersing, brush coating, and the like. After the application of the coating composition, levelling is preferably implemented by leaving the coating to sit for a certain amount of time. The lubricating property of the obtained coating film can be improved through levelling Note that when applying the coating composition, the base material may be preheated, but from the perspective of operation ease, the coating composition is preferably applied at room temperature (approximately 25 C).

Next, if the coating composition for a lubricating coating film contains a solvent, the coating composition is left, for example, for 1 to 60 minutes at room temperature, or for example, it is preferably heated for 1 to 60 minutes at 40 to 80 C to remove the solvent.

After the solvent is removed, the composition film coated onto the surface of the base material is heated, and a cured coating film can be obtained. The heating conditions can be appropriately adjusted, and for example, heating can be implemented for 5 to 90 minutes at 170 to 200 C. If necessary, heating for the abovementioned solvent removal and resin curing can be performed simultaneously.

The present invention also relates to a lubricating coating film obtained in this manner. The thickness of the coating film of the present invention may be appropriately selected, and for example, can be 1 to 50 micro-meters, preferably 2 to 25 micro-meters, and more preferably 3 to 15 micro-meters.

The lubricating coating film of the present invention exhibits a high level of flexibility in particular, and if a lubricating coating film having a film thickness of 10 to 20 micro-meters is formed in particular, a lubricating coating film can be imparted having an Erichsen value (in accordance with JIS Z 2247 issued in 2006) of 8.0 mm or greater, and favourably 8.5 mm or greater. Note that a film thickness of 10 to 20 micro-meters is a condition for specifying a lubricating coating film obtained by the coating composition for a lubricating coating film with that physical property value (Erichsen value), and it goes without saying that lubricating coating films having film thicknesses outside of this range are also included in the subject of protection of the present invention. Moreover, as other bend related standards corresponding to the Erichsen value defined by the abovementioned JIS Z 2247 (2006) standard, the "Metallic materials—Sheet and strip—Erichsen cupping test" defined by the ISO 20482 (2013) standard, and other standards exist. However, as described previously, the definition of the Erichsen value in the present invention is a measurement value based on JIS Z 2247.

The coating composition for a lubricating coating film contains component (C), and therefore, the coating film of the present invention can be used as a superior lubricating coating film.

The lubricating coating film of the present invention can be favourably used on the surface of a sliding member. The type of sliding member is not particularly limited, and examples include sliding members made of rubber, plastic, or metal.

Example of sliding members made of metal include a crankshaft, compressor shaft, slide bearing, gear, oil pump gear, piston, piston ring, piston pin, gasket, door lock, guide rail, seatbelt buckle, brake pad, brake pad clip, brake shim, brake insulator, hinge, screw, and pressurization pad.

Examples of sliding members made of rubber include a timing belt, conveyor belt, body seal for a sunroof, glass run, weather stripping, oil seal, packing, wiper blade, doctor blade, charging roller, developing roller, toner supply roller, transfer roller, heat roller, pressurization roller, cleaning blade, paper feed roller, transport roller, doctor blade, intermediate transfer belt, intermediate transfer drum, heat belt, and the like.

Examples of sliding members made of plastic include gears, door panels, instrument panels, door locks, bearings, and pads.

The form of the sliding member is also not particularly limited, and for example, the sliding member may have a fibrous form or may contain fibres. Examples of sliding members having a fibrous form and of sliding members containing fibres include vehicle seats, carpet, tire cord, seatbelts, and the like.

The sliding member of the present invention is provided with a base material having a lubricating coating film formed on the surface thereof, and for example, can be produced through a step of applying the coating composition for a lubricating coating film onto a surface of a base material, and a step of heating the coating composition for a lubricating coating film to form a lubricating coating film on a surface of the base material.

The base material preferably contains metal, and more preferably is made of metal.

The method of producing the sliding member of the present invention may further include a step of pressing or punching the base material having the lubricating coating film formed on a surface thereof.

If the base material is made of metal in particular, after the lubricating coating film is formed on the surface of the base material, the sliding member can be produced by pressing, punching, or the like the base material, and the sliding member can be efficiently produced.

Examples of this type of sliding member include a crankshaft, compressor shaft, slide bearing, gear, oil pump gear, piston, piston ring, piston pin, gasket, door lock, guide rail, seatbelt buckle, brake pad, brake pad clip, brake shim, brake insulator, hinge, screw, or pressurization pad, but a brake pad, brake pad clip, brake shim, and a brake insulator are preferable, a brake pad and brake pad clip are more preferable, and a brake pad clip is even more preferable.

INDUSTRIAL APPLICABILITY

The present invention can be used in various types of products provided with a lubricating coating film, and in particular, can be favourably used in the production of a sliding member provided with a lubricating coating film.

EXAMPLES

The present invention is described below with reference to examples, but the present invention is in no way limited thereby.

Examples 1 to 13 and Comparative Examples 1 to 5

Coating compositions for lubricating coating films for Examples 1 to 13 and Comparative Examples 1 to 5 were obtained by mixing each component shown in Table 1-1, 1-2 and Table 2 at the ratios shown in Table 1-1, 1-2 and Table 2. Note that the numeric figures shown in Table 1-1, 1-2 and Table 2 represent parts by weight. Also, the solid lubricants used in the tables are as follows.

Fluororesin microparticles: Polytetrafluoroethylene powder (dry solid content of 100 weight %) having a median diameter of 2 to 7 micro-meters as measured by laser diffraction scattering type particle size distribution method.

Titanium nitride microparticles: Black titanium nitride powder (dry solid content of 100 weight %) having a median diameter of 0.8 to 1.0 micro-meters as measured by a laser diffraction scattering type particle size distribution method.

Titanium oxide microparticles: White rutile type titanium oxide powder (dry solid content of 100 weight %) having a median diameter of 0.3 to 0.5 micro-meters as measured by a laser diffraction scattering type particle size distribution method.

Boron nitride particles: White boron nitride powder (dry solid content of 100 weight %) having a median diameter of 5 to 11 micro-meters as measured by a laser diffraction scattering type particle size distribution method.

Alumina particles: White alumina powder (dry solid content of 100 weight %) having a median diameter of 0.3 to 0.5 micro-meters as measured by a laser diffraction scattering type particle size distribution method.

Silicon nitride microparticles: White silicon nitride powder (dry solid content of 100 weight %) having a median diameter of 1 to 5 micro-meters as measured by a laser diffraction scattering type particle size distribution method.

Silicon dioxide microparticles: White silicon dioxide powder (dry solid content of 100 weight %) having a particle diameter of the primary particles of 5 to 50 nm as observed with a scanning electron microscope.

Molybdenum disulfide microparticles: Molybdenum disulfide powder (dry solid content of 100 weight %) having a median diameter of 1 to 6 micro-meters as measured by a laser diffraction scattering type particle size distribution method.

Graphite microparticles: Graphite powder (dry solid content of 100 weight %) having a median diameter of 3 to 5 micro-meters as measured by a laser diffraction scattering type particle size distribution method.

Carbon black: Black carbon black powder (dry solid content of 100 weight %) having a particle diameter of the primary particles of 20 to 40 nm as observed with a scanning electron microscope.

TABLE 1-1

| Composition | | Epoxy Equivalent Weight | Examples | | | | | | |
|---|---|---|---|---|---|---|---|---|---|
| | | | 1 | 2 | 3 | 4 | 5 | 6 | 7 |
| Binder | Phenolic resin | | 65.0 | 50.0 | 65.0 | 85.0 | 65.0 | 65.0 | 65.0 |
| | Epoxy resin 1 | 875-975 | 35.0 | 50.0 | 35.0 | 35.0 | — | — | 35.0 |
| | Epoxy resin 2 | 600-700 | — | — | — | — | 35.0 | — | — |
| | Epoxy resin 3 | 2400-3300 | — | — | — | — | — | 35.0 | — |
| Organic Solid Lubricant | Fluororesin microparticles | | 50.0 | 50.0 | 50.0 | 50.0 | 50.0 | 50.0 | 50.0 |
| Inorganic Solid Lubricant | Titanium nitride microparticles | | 7.0 | 7.0 | 2.5 | 2.5 | 7.0 | 7.0 | — |
| | Titanium oxide microparticles | | 5.0 | 5.0 | 9.5 | 10.0 | 5.0 | 5.0 | — |
| | Boron nitride particles | | — | — | — | — | — | — | — |
| | Alumina particles | | — | — | — | — | — | — | — |
| | Silicon nitride microparticles | | — | — | — | — | — | — | — |
| | Silicon dioxide microparticles | | — | — | — | — | — | — | — |
| | Molybdenum disulfide microparticles | | — | — | — | 23.0 | — | — | — |
| | Graphite microparticles | | — | — | — | 7.0 | — | — | — |
| Pigment | Carbon Black | | 6.0 | 8.0 | 8.0 | — | 8.0 | 6.0 | 15.0 |
| Solvent | Methylethylketone | | 240.0 | 240.0 | 240.0 | 240.0 | 240.0 | 240.0 | 240.0 |
| | Methyl isobutyl ketone | | 100.0 | 100.0 | 100.0 | 100.0 | 100.0 | 100.0 | 100.0 |
| | Cyclohexanone | | 90.0 | 90.0 | 90.0 | 90.0 | 90.0 | 90.0 | 90.0 |
| Total | | | 600 | 600 | 600 | 623 | 600 | 600 | 595 |
| Phenolic resin:Epoxy resin (weight ratio) | | | 65:35 | 50:50 | 85:35 | 85:35 | 65:35 | 85:35 | 85:35 |
| Flexibility | | | A | A | A | A | B | B | A |
| Erichsen Value (JIS Z 2247) mm | | | 9.5 | 9.5 | 9.5 | 9.5 | 9.5 | 9.0 | 8.5 |
| Coefficient of Friction | | | 0.14 | 0.14 | 0.15 | 0.15 | 0.15 | 0.15 | 0.59 |
| Wear Depth | | | A | B | B | B | B | B | D |

TABLE 1-2

| Composition | | Epoxy Equivalent Weight | Examples 8 | 9 | 10 | 11 | 12 | 13 |
|---|---|---|---|---|---|---|---|---|
| Binder | Phenolic resin | | 50.0 | 65.0 | 65.0 | 65.0 | 65.0 | 65.0 |
| | Epoxy resin 1 | 875-975 | 50.0 | 35.0 | 35.0 | 35.0 | 35.0 | 35.0 |
| | Epoxy resin 2 | 600-700 | — | — | — | — | — | — |
| | Epoxy resin 3 | 2400-3300 | — | — | — | — | — | — |
| Organic Solid Lubricant | Fluororesin microparticles | | 50.0 | 50.0 | 50.0 | 50.0 | 50.0 | — |
| Inorganic Solid Lubricant | Titanium nitride microparticles | | — | — | — | — | — | — |
| | Titanium oxide microparticles | | — | — | — | — | — | — |
| | Boron nitride particles | | — | 12.0 | — | — | — | — |
| | Alumina particles | | — | — | 12.0 | — | — | — |
| | Silicon nitride microparticles | | — | — | — | 12.0 | — | — |
| | Silicon dioxide microparticles | | — | — | — | — | 12.0 | — |
| | Molybdenum disulfide microparticles | | — | — | — | — | — | 66.0 |
| | Graphite microparticles | | — | — | — | — | — | 27.0 |
| Pigment | Carbon Black | | 15.0 | 8.0 | 8.0 | 8.0 | 8.0 | 12.0 |
| Solvent | Methylethylketone | | 240.0 | 240.0 | 240.0 | 240.0 | 240.0 | 240.0 |
| | Methyl isobutyl ketone | | 100.0 | 100.0 | 100.0 | 100.0 | 100.0 | 100.0 |
| | Cyclohexanone | | 90.0 | 90.0 | 90.0 | 90.0 | 90.0 | 90.0 |
| Total | | | 595 | 600 | 600 | 600 | 600 | 635 |
| Phenolic resin:Epoxy resin (weight ratio) | | | 50:50 | 65:35 | 65:35 | 65:35 | 65:35 | 65:35 |
| Flexibility | | | A | A | A | A | A | A |
| Erichsen Value (JIS Z 2247) mm | | | 9.0 | 8.5 | 9.5 | 9.5 | 9.5 | 9.5 |
| Coefficient of Friction | | | 0.58 | 0.57 | 0.17 | 0.21 | 0.23 | 0.17 |
| Wear Depth | | | D | D | B | A | A | C |

Phenolic resin: Resol type phenolic resin (hydroxyl group equivalent 111 g/eq, cured color: gold)
Epoxy resin 1: jER (registered trademark) 1004 (from Mitsubishi Chemical Corporation)
Epoxy resin 2: jER (registered trademark) 872 (from Mitsubishi Chemical Corporation)
Epoxy resin 3: jER (registered trademark) 1009 (from Mitsubishi Chemical Corporation)

TABLE 2

| Composition | | Epoxy Equivalent Weight | Comparative Examples 1 | 2 | 3 | 4 | 5 |
|---|---|---|---|---|---|---|---|
| Binder | Phenolic resin | | 35.0 | 35.0 | 65.0 | 65.0 | 65.0 |
| | Expoxy resin 1 | 875-975 | 65.0 | 65.0 | — | — | — |
| | Epoxy resin 4 | 230-250 | — | — | 35.0 | — | — |
| | Epoxy resin 5 | 450-500 | — | — | — | 35.0 | — |
| | Epoxy resin 6 | 7500-8500 | — | — | — | — | 35.0 |
| Organic Solid Lubricant | Fluororesin microparticles | | 50.0 | 50.0 | 50.0 | 50.0 | 50.0 |
| Inorganic Solid Lubricant | Titanium nitride microparticles | | — | 7.0 | 7.0 | 7.0 | 7.0 |
| | Titanium oxide microparticles | | — | 5.0 | 5.0 | 5.0 | 5.0 |

TABLE 2-continued

| Composition | | Epoxy Equivalent Weight | Comparative Examples | | | | |
|---|---|---|---|---|---|---|---|
| | | | 1 | 2 | 3 | 4 | 5 |
| Pigment | Carbon Black | | 15.0 | 8.0 | 8.0 | 8.0 | 8.0 |
| Solvent | Methylethyl-ketone | | 240.0 | 240.0 | 240.0 | 240.0 | 240.0 |
| | Methyl isobutyl ketone | | 100.0 | 100.0 | 100.0 | 100.0 | 100.0 |
| | Cyclo-hexanone | | 90.0 | 90.0 | 90.0 | 90.0 | 90.0 |
| | Total | | 595 | 600 | 600 | 600 | 600 |
| Phenolic resin:Epoxy resin (weight ratio) | | | 35:85 | 35:85 | 65:35 | 65:35 | 65:35 |
| Flexibility | | | D | D | D | D | D |
| Erichsen Value (JIS Z 2247) mm | | | 6.0 | 7.0 | 7.0 | 6.0 | 7.0 |
| Coefficient of Friction | | | 0.6 | 0.15 | 0.15 | 0.15 | 0.16 |
| Wear Depth | | | D | D | C | B | C |

Epoxy resin 4: Epiclon TSR-960 (from DIC Corporation)
Epoxy resin 5: Epiclon TSR-601 (from DIC Corporation)
Epoxy resin 6: jER (registered trademark) 1256 (from Mitsubishi Chemical Corporation)

<Lubricating Coating Film Formation>

A bar coater (#44) was used to apply each coating composition for a lubricating coating film onto a surface of a stainless steel plate (SUS301) that had been solvent degreased, and the coating composition was then heated for 20 minutes at a temperature of 200 C to prepare a cured coating film having a thickness of 15 to 20 micro-meters.

The below-described measurements and tests were performed on the lubricating coating films prepared from each of the coating compositions for lubricating coating films for Examples 1 to 13 and Comparative Examples 1 to 5, and the lubricating coating films were evaluated. The results are shown in Tables 1 and 2.

<Erichsen Test in Conformance with JIS Z 2247 (2006): Erichsen Value (mm) Measurements>

Erichsen tests were conducted in conformance with JIS Z 2247 (2006). The test pieces were 0.6 mm thick and 70 mm wide by 150 mm long. A bar coater (#44) was used to apply each coating composition for a lubricating coating film onto the surface of steel plates (SPCC-SB) that had been solvent degreased, and the coating compositions were heated for 20 minutes at a temperature of 200 C to fabricate test pieces for Erichsen testing having a coating thickness of 12 to 17 micro-meters. Next, the test pieces obtained as described above were secured to an Erichsen tester (COTES from Coating Tester KK), and subjected to punch pressing at a speed of 5 to 10 mm/minute, and the pressing distances at which cracking and peeling were first generated in the coating were measured. Testing was conducted at least three times, and the measured values of each of the tests were averaged to obtain the Erichsen value. The measured Erichsen values (mm) are shown in Tables 1 and 2. Note that an Erichsen value of 8.0 mm or greater indicates a coating film with good flexibility.

<Flexibility>

Pressure was applied at an angle of 90 to each of the stainless steel test pieces on which a lubricating coating film was formed to thereby bend the test pieces, after which the bend locations were scratched with an acrylic resin plate, and the number of times that the bend locations had to be scratched until the lubricating coating film peeled was recorded.

A (30 or more times), B (15 to 29 times), C (6 to 10 times), D (5 or fewer times)

<Coefficient of Friction>

A reciprocal motion frictional abrasion testing machine that caused the stainless steel test pieces on which lubricating coating films were formed to reciprocate by causing ½ inch steel balls having a vertical load applied to slide and move was used, and the coefficient of dynamic friction (units: micro) during sliding after 5000 times of sliding of the steel balls was measured under conditions that included a sliding speed of 100 cpm, a weight of 1 kg, and a sliding distance (stroke) of 50 mm.

<Wear Depth>

After the measurements, a surface roughness gage (SURFCOM 1400D from Tokyo Seimitsu Co., Ltd.) was used to measure the difference in surface levels of the stainless steel plate between the sliding locations and non-sliding locations, and the difference thereof was recorded as the wear depth (units: micro-meters).

A (Less than 5 micro-meters), B (5 to 10 micro-meters), C (11 to 19 micro-meters), D (20 micro-meters or greater, or the base material is exposed)

As is clear from Table 1, the coating compositions for lubricating coating films of Examples 1 to 13 can form a lubricating coating film having excellent flexibility with an Erichsen value of 8 mm or greater. When the coating composition contains fluororesin microparticles and a prescribed metal oxide or metal nitride in particular, the lubricating coating film can be provided with not only excellent flexibility, but also with a low frictional property and high wear resistance.

On the other hand, as is clear from Table 2, the lubricating coating films formed from the coating compositions for lubricating coating films of Comparative Examples 1 to 5 exhibit little flexibility. The results for Comparative Examples 2 to 5 in particular indicated inferior wear resistance regardless of compositions containing titanium nitride and titanium oxide, and thus in addition to the specification of components (A) and (B), which are characteristics of the invention of the present application, if the ratio of component (A) to component (B) is not within the prescribed range, it is difficult to realize the technical effects of the invention of the present application regardless of the type of solid lubricant that is used.

The invention claimed is:

1. A coating composition for a lubricating coating film, the coating composition comprising:
   (A) a phenolic resin;
   (B) an epoxy resin having an epoxy equivalent weight of 600 to 4000, the epoxy equivalent weight defined by the number average molecular weight per the number of epoxy groups in a single molecule; and
   (C) at least one type of solid lubricant;
      wherein a weight ratio of component (A) per the total weight of component (A) and component (B) is at least 50 weight %;
      wherein component (C) comprises:
      (C1) fluororesin comprising polytetrafluoroethylene; and
      (C2) one or more types of metal oxide or metal nitride selected from titanium nitride, titanium oxide, aluminum oxide, silicon nitride, silicon dioxide, and mixtures thereof;
      wherein the weight % ratio of component (C1) and (C2) is in a range of 60:40 to 85:15; and
      wherein the coating composition is free of carbon fibers.

2. The coating composition according to claim 1, wherein the epoxy equivalent weight of component (B) is 800 to 1200.

3. The coating composition according to claim 1, wherein the weight ratio of component (A) per the total weight of component (A) and component (B) is at least 60 weight % and not more than 80 weight %.

4. The coating composition according to claim 1, wherein component (C) further comprises at least one or more types of substances selected from polyethylene resin, polyamide resin, and mixtures thereof.

5. The coating composition according to claim 1, wherein component (C2) comprises titanium nitride and titanium oxide.

6. The coating composition according to claim 1, wherein component (C) is contained at an amount of 1 to 200 parts by mass per 100 parts by mass of the total weight of components (A) and (B).

7. A lubricating coating film obtained by curing the coating composition according to claim 1.

8. A lubricating coating film obtained by curing the coating composition according to claim 1 and having an Erichsen value according to JIS Z 2247 of 8.0 mm or greater when the coating composition is cured with a film thickness of 10 to 20 μm.

9. A sliding member provided with the lubricating coating film according to claim 7.

10. The sliding member according to claim 9, wherein the sliding member is a crankshaft, a compressor shaft, a slide bearing, a gear, an oil pump gear, a piston, a piston ring, a piston pin, a gasket, a door lock, a guide rail, a seatbelt buckle, a brake pad, a brake pad clip, a brake shim, a brake insulator, a hinge, a screw, or a pressurization pad.

11. A method for manufacturing a sliding member provided with a base material having a surface and a lubricating coating film formed on the surface, the method comprising the steps of:
   applying a coating composition onto the surface of the base material; and
   heating the coating composition to form the lubricating coating film on the surface of the base material;
   wherein the coating composition is according to claim 1.

12. The method according to claim 11, wherein the base material comprises metal.

13. The method according to claim 11, further comprising the step of pressing or punching the base material having the lubricating coating film formed on the surface.

14. The method according to claim 11, wherein the sliding member is a crankshaft, a compressor shaft, a slide bearing, a gear, an oil pump gear, a piston, a piston ring, a piston pin, a gasket, a door look, a guide rail, a seatbelt buckle, a brake pad, a brake pad clip, a brake shim, a brake insulator, a hinge, a screw, or a pressurization pad.

15. The method according to claim 12, further comprising the step of pressing or punching the base material having the lubricating coating film formed on the surface.

16. The coating composition according to claim 1, wherein component (C2) comprises one or more types of metal oxide or metal nitride selected from aluminum oxide, silicon nitride, silicon dioxide, and mixtures thereof.

17. The coating composition according to claim 1, further comprising at least one solvent selected from methylethylketone, methyl isobutyl ketone, cyclohexanone, and mixtures thereof.

18. The coating composition according to claim 17, wherein the solvent is present in a range of 10 to 800 parts by weight based on 100 parts by weight of the total weight of components (A) and (B).

19. The coating composition according to claim 18, further comprising at least one pigment, wherein the pigment comprises carbon black.

20. The coating composition according to claim 19, wherein the pigment is present in a range of 0.1 to 5 weight % based on the total weight % of the composition.

* * * * *